United States Patent
Brieschke et al.

[11] 3,849,049
[45] Nov. 19, 1974

[54] APPARATUS FOR THE BLOW MOLDING OF HOLLOW BODIES MADE OF THERMOPLASTIC SYNTHETIC MATERIAL

[75] Inventors: Ewald Brieschke; Erich Kiefer, both of Bonn-Holzlar; Heinz Rolniczak, Hennef-Stossdorf, all of Germany

[73] Assignee: Kautex-Werke Reinold Hagen GmbH, Bonn-Holzlar, Germany

[22] Filed: Sept. 12, 1972

[21] Appl. No.: 288,357

[30] Foreign Application Priority Data
Sept. 13, 1971 Germany.............................. 2145673

[52] U.S. Cl. 425/326 B, 425/DIG. 205, 425/DIG. 206
[51] Int. Cl............................ B29d 23/03, B29d 23/04
[58] Field of Search......... 425/326 B, 387 B, 242 B, 425/DIG. 205, DIG. 206, DIG. 213, DIG. 203, 324 B; 264/98, 99

[56] References Cited
UNITED STATES PATENTS

| | | | |
|---|---|---|---|
| 2,975,473 | 3/1961 | Hagen et al.................... | 425/326 X |
| 2,988,776 | 6/1961 | Schaich.......................... | 425/326 X |
| 3,172,152 | 3/1965 | Uhlig.............................. | 425/806 X |
| 3,583,031 | 6/1971 | Kader et al..................... | 425/326 X |
| 3,699,199 | 10/1972 | MacDuff......................... | 425/326 X |

Primary Examiner—Andrew R. Juhasz
Assistant Examiner—David B. Smith
Attorney, Agent, or Firm—Edwin E. Greigg

[57] ABSTRACT

In a blow molding apparatus there is provided a receiving station in which a multi-part mold is charged with a parison supplied by an extruder, a removing station in which the parison in the mold is expanded and then removed from the mold and a depositing station to which a gripper carries the finished article from the removing station. The mold which is reciprocated between the receiving station and the removing station and the gripper which, synchronously with the mold, is reciprocated between the removing station and the depositing station, are mounted on a carriage moved back and forth by a first drive means. The multi-part mold and the multi-part gripper are synchronously opened and closed by a linkage system actuated by a second drive means which is independent from the first drive means and which is also mounted on said carriage.

18 Claims, 3 Drawing Figures

APPARATUS FOR THE BLOW MOLDING OF HOLLOW BODIES MADE OF THERMOPLASTIC SYNTHETIC MATERIAL

FIELD OF THE INVENTION

This invention relates to an aparatus for making, by means of a blow molding process, thermoplastic hollow bodies, such as bottles, cans or the like. The apparatus is of the type that includes a multi-part mold which is movable back and forth, preferably in a linear path, between a receiving station associated with an extruder head and a removing station in which the hollow body is taken out of the mold.

OBJECTS AND SUMMARY OF THE INVENTION

It is an object of the invention to provide an improved apparatus of the aforenoted type in which the different individual cycles of motion are effected by means which are easily supervisable and yet are in a compact spatial arrangement.

It is a further object of the invention to provide an improved apparatus of the aforenoted type in which the motions of the components are executed in a rapid manner for obtaining a high productivity.

It is also an object of the invention to provide an improved apparatus of the aforenoted type in which the generated forces, particularly the bending moments, are maintained at the lowest possible level.

It is still a further object of the invention to provide an improved apparatus of the aforenoted type in which the accuracy regarding the cooperation of the individual machine components and necessary for the intended high output is effected with reduced expenditures.

It is also an object of the invention to provide an improved apparatus of the aforenoted type which may find universal application, particularly with regard to the shape of the articles to be manufactured.

Briefly stated, according to the invention, the mold parts are carried by arms which, in turn, are swingably mounted on a shuttling carriage, which, for the purpose of moving the mold between the receiving station and the removing station, is mounted on guide rail means. With the arms that carry the mold parts there are associated drive means which are mounted on the carriage and which serve for the opening and closing of the mold. There are provided further, independent drive means for effecting the reciprocating motion of the carriage. The travelling path of the mold is substantially transversal to the direction of extrusion and extends between the receiving station and the removing station. The means for introducing air into the mold is preferably formed as a blow and gauging mandrel which is introduced axially into the mold and into a parison disposed therein.

Thus, the invention provides for the two types of motions, that is, on the one hand, the back and forth motion, and, on the other hand, the opening and closing motion, separate drive means for the purpose of an independent operation. Since the motions of the mold are dependent of the extrusion of the parison only to the extent that in the receiving station each time there should be available a parison sufficiently long for making a hollow body, there are no other limitations on the course of motions to be executed by the mold so that these courses of motion may be designed in an optimal manner substantially from the point of view of the intended high productivity.

The invention will be better understood as well as further objects and advantages become more apparent from the ensuing detailed specification of a preferred, although exemplary embodiment taken in conjunction with the drawing.

DESCRIPTION OF THE PREFERRED EMBODIMENT

Figure 1:
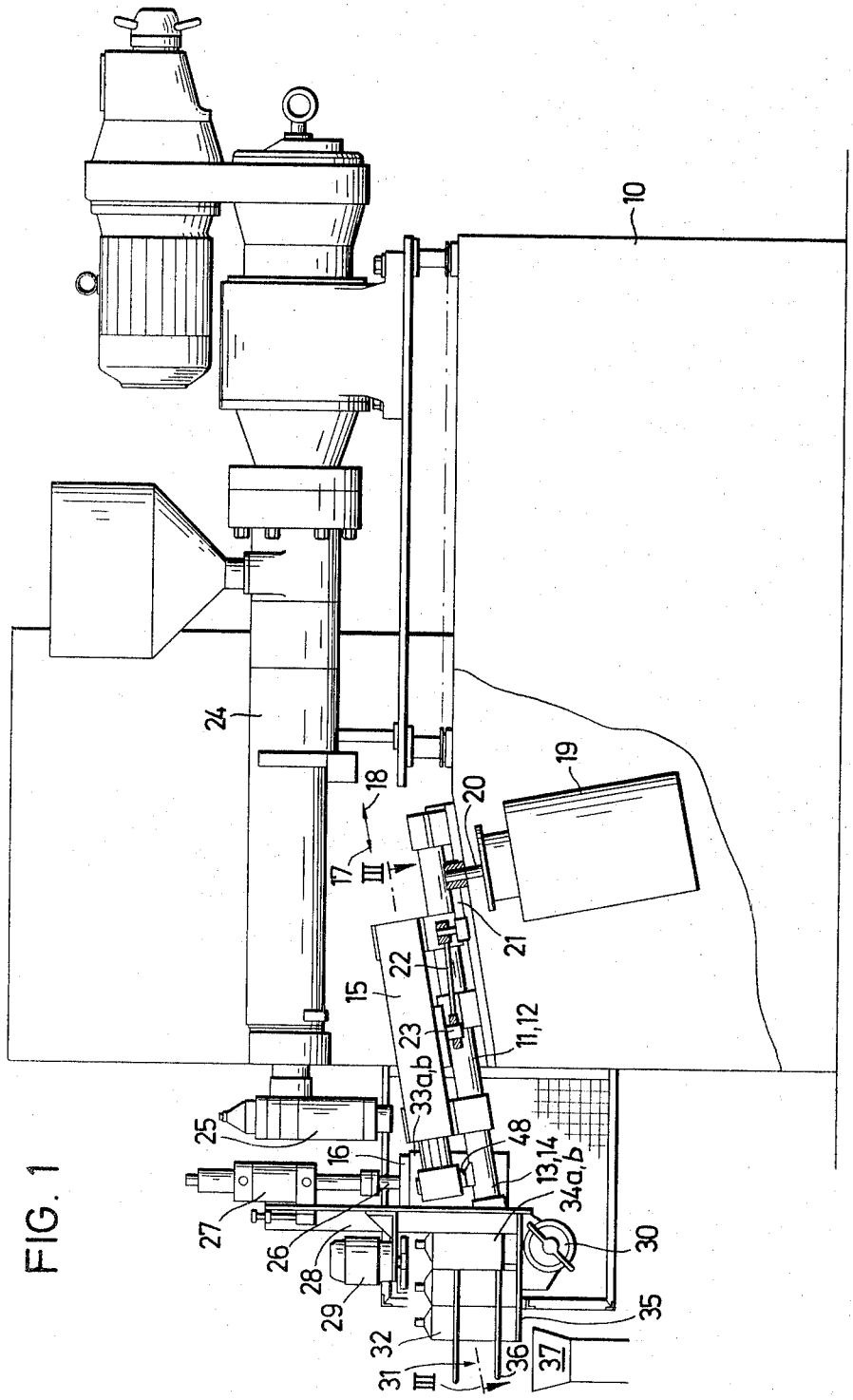
FIG. 1 is a schematic side elevational view of the preferred embodiment shown with the mold in the removing station.
Figure 2:
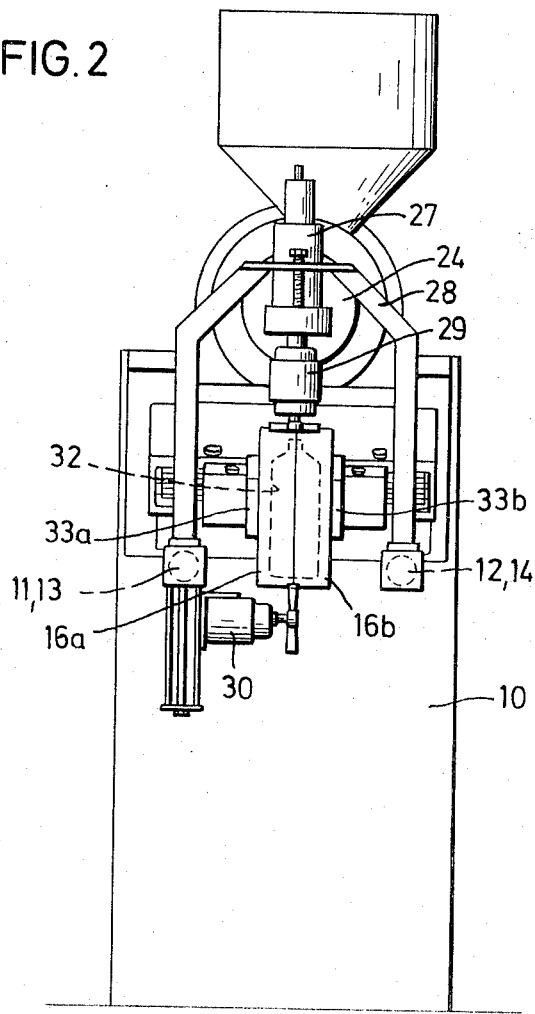
FIG. 2 is a front elevational view of the structure shown in FIG. 1.

Turning now to the figures, to a stand 10 there is secured guide means which extend in a plane substantially but not exactly normal to the direction of extrusion, and at a slight angle of inclination from the horizontal, the guide means being constituted by two parallel, horizontally spaced inclined bars 11 and 12 which project beyond the outline of the stand 10 and the free ends 13 and 14 of which are situated lower than the other ends attached to the stand 10. On the bars 11 and 12 there is slidably mounted a carriage 15 to one frontal side of which there is secured a hollow mold 16 with the interposition of a linkage system described hereinafter. The mold 16 is formed of two mold halves 16a and 16b. The reciprocation of the carriage 15 in the direction of arrows 17, 18 is effected by a brake motor 19, the shaft 20 of which is connected to the carriage 15 through a crank 21 and a connecting rod 22 coupled directly to pin 23 affixed to the carriage 15.

The stand 10 further supports a horizontal extruder 24 which, at its downstream end, is provided with a downwardly oriented extruder head 25 (receiving station). Ahead of the latter there is positioned a blow and gauging mandrel 26 (blow molding and removing station), which is movable up and down by means of a piston contained in, and operated by a power cylinder 27. The latter is affixed to a bridge 28 which may simultaneously serve for carrying additional components. Thus, to the bridge 28 there are mounted two rotary impact knives 29 and 30 which remove from the finished articles 32 any web-like or similar protrusion that should be scrapped. Further, the bridge 28 carries a conveyor track 31 which receives the finished blow molded hollow articles 32.

The bridge 28 itself is carried by the two bars 11, 12 and is disposed adjacent the free ends 13, 14 of said bars. The two mold halves 16a and 16b are attached to supports 33a, 33b which are provided with extensions 34a, 34b which complement each other to form a gripper. This arrangement is so designed that when according to FIG. 1 the mold is disposed under the mandrel 26, the gripper 34a, 34b projects into that end of the conveyor track 31 which is adjacent the mold 16 and which constitutes a depositing station. The conveyor track is formed of two parallel-arranged base strips 35, the upper faces of which serve for the upright support of the hollow bodies 32 and lateral guide strips 36 or the like.

Each of the two plate-like supports 33a and 33b is provided, at its side remote from the mold halves 16a and 16b, with housing-like continuations 38a and 38b, respectively. To each of the housing-like continuations 38a and 38b there is pivotally secured an arm 39, the pivotal axis of which extends normal to the plane in which the carriage 15 travels. The arms 39 are pivotally secured to the carriage 15 by means of a shaft 40. Each arm 39 is pivotally connected with one end of separate intermediate levers 41. The two other ends of these intermediate levers 41 are pivotally connected with a common driving lever 42 which, in turn, is pivotally supported by a shaft 43 affixed to the carriage 15. The pin 23 which is engaged by the connecting rod 22 of the motor 19, may be a continuation of the shaft 43.

With the carriage 15 there is further associated a pneumatic power cylinder 44, the piston of which is in engagement through a piston rod 45 with a shaft 46. To the latter there is pivotally connected one of the two levers 41 and the driving lever 42. By means of the aforedescribed lever arrangement an actuation of the power cylinder 44 effects an opening or closing motion of the supports 33a, 33b which, in turn, bring about an opening or closing motion of the mold parts 16a, 16b. For the parallel guidance of the mold parts 16a and 16b there are provided separate levers 47 (only one shown) which are pivotally connected at their ends to the continuations 38a, 38b and to the carriage 15. The aforenoted parallel guidance of the mold parts is advantageous in that there are no limitations regarding a desired cross-sectional configuration of the blow molded article. Further, the mold closing step is more uniform since the cooperating faces of the two mold halves have the same distance from one another during the mold closing step and when the closing position is reached, all parts of the cooperating mold faces arrive into engagement with one another simultaneously. This is of particular advantage in a case when the mold has two or more pockets which are arranged in series when viewed in the direction of motion between the receiving station and the removing station. In this manner in one operational cycle simultaneously two or more articles may be made.

Figure 3:
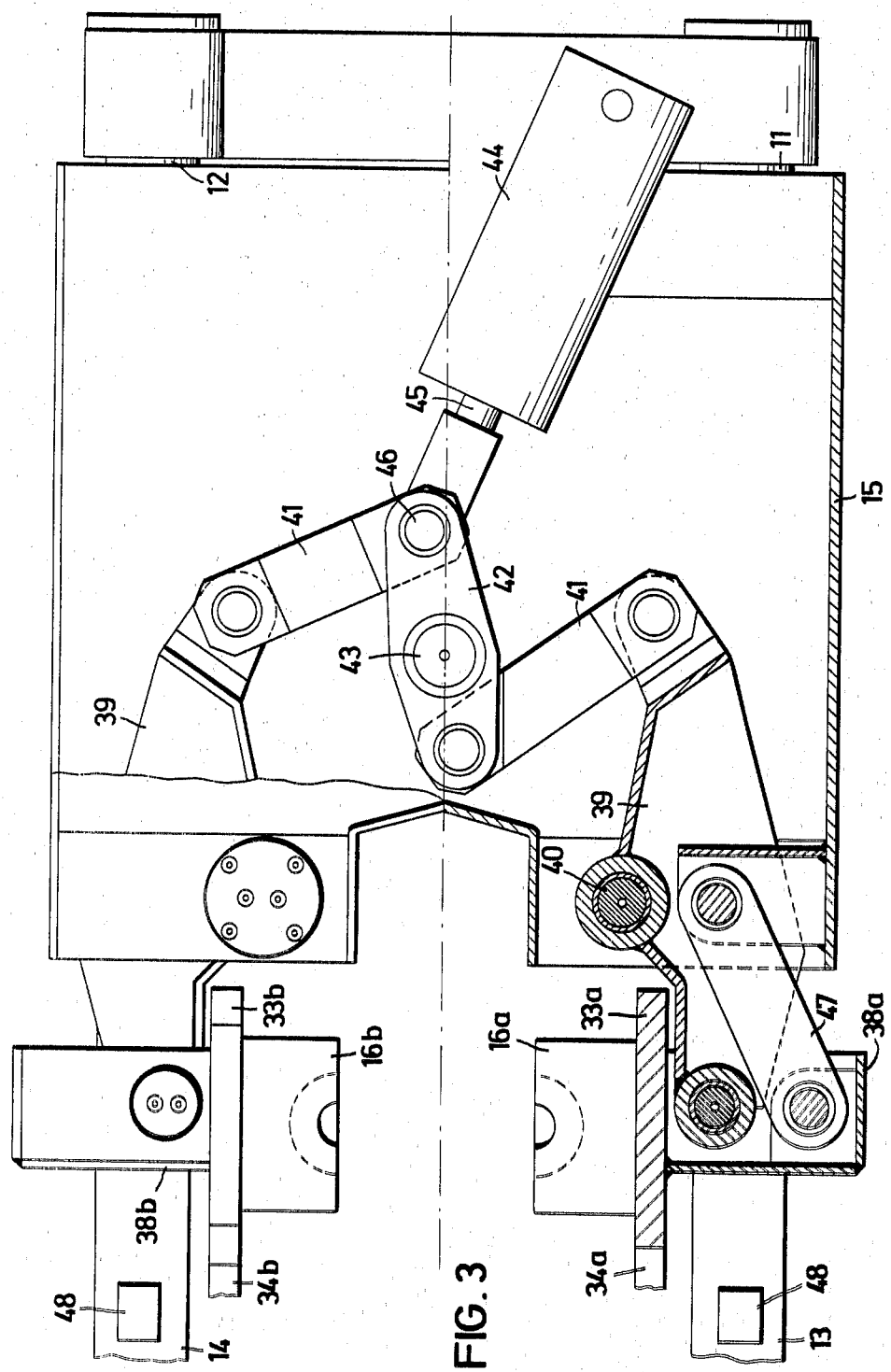
FIG. 3 is a sectional view along line III—III of FIG. 1, showing the mold positioned in the receiving station.

The apparatus depicted in the figures operates in such a manner that the extruder head 25 supplies preferably continuously a parison which is received by the mold 16. The parison has in general a tubular configuration. For the purpose of receiving the parison, the mold is situated below the extruder head 25 in the receiving station after the carriage 15, together with the mold 16, has been shifted towards the right in the direction of the arrow 18 into one of its terminal positions. Both mold halves 16a and 16b are now in a separated condition and assume a position illustrated in FIG. 3. The mold 16 is closed about the parison suspended from the extruder head 25 as soon as the parison has attained a sufficient length. Subsequently, the mold is moved in the direction of arrow 17 into its other terminal position shown in FIG. 1 in which it is situated in the blow molding and removing station below the mandrel 26. The latter, by this time, assumes a withdrawn position above the mold, so as not to obstruct the motion of the mold in the direction of the arrow 17. After the mold has arrived in the blow molding and removing station, the mandrel 26 is shifted downwardly, whereby its free terminus is thrust in a known manner into the parison disposed in the upper end of the mold 16. At this time or subsequently, there is effected the expansion of the parison by virtue of a gaseous medium, such as pressurized air, introduced into the parison through the mandrel 26. Subsequent to sufficient cooling of the hollow body formed in the mold in the afore-described manner, the latter is opened by separating the two mold halves 16a, 16b and is moved in the direction of the arrow 18 into the receiving station. The precedingly prepared hollow body is now supported exclusively by the mandrel 26 which extends from above into the opening of the hollow body, for example, into its neck portion.

Regarding the gripper formed of the extensions 34a and 34b, the apparatus is so designed that these two components are disposed about the prepared hollow body suspended from the mandrel 26 in the removing station and grasp the same as the mold 16 situated in the receiving station is closed about the parison suspended from the extruder head 25. Upon termination of the aforedescribed closing step, the hollow body is supported by the gripper 34a, 34b so that the mandrel 26 may be removed by sliding it out upwardly from the finished hollow article. Thus, as the mold 16a, 16b is moved subsequently in the direction of the arrow 17 from the receiving station to the removing station and simultaneously the gripper 34a, 34b is moved from the removing station to the depositing station (that is, the upstream end of the conveyor track 31), the hollow body is carried with the gripper and then deposited on the conveyer track 31. The advance of the hollow bodies 32 on the conveyer track is effected intermittently by the latest deposited hollow article 32 exerting a forward push on all the other articles. At the left, downstream end of the conveyer track 31 there is disposed a conveyer tube 37, which receives in sequence each downwardly falling hollow body and guides it to an after-connected station (not shown).

As the blow mandrel 26 is thrust into the mold and the parison disposed therein, there are exerted on the mold substantial forces which, in the absence of appropriate countermeasures, have to be taken up and transmitted by the elements that carry the mold. In order to relieve the lever system carrying the mold parts 16a, 16b of the aforenoted forces to the greatest possible extent, the two housing-like continuations 38a and 38b of the support 33a and 33b which, in any event, are at a small distance from the guide bars 11 and 12 are, during the introduction of the mandrel 26 into the parison, either in engagement with the guide bars 11, 12 or are disposed at such a small distance therefrom that a slight deformation of the components 38a, 38b generated by the introduction of the mandrel 26, will cause the aforenoted enagement to occur. In this manner, the forces generated by the introduction of the mandrel 26 into the mold are transmitted directly to the bars 11 and 12, thus bypassing the arms 39.

For reducing the surface compression it is expedient to provide the bars 11 and 12, at those portions which dwell in the removing station, with planar surfaces 48. As it may be observed from FIG. 1, each planar surface 48 is provided on a boss which is integral with the associated guide bar 11, 12 and which flares in one direction of motion. The said boss bridges the clearance between the components 38a, 38b, on the one hand, and the respective guide bar 11, 12, on the other hand. It is to be understood that it is feasible to provide the surface 48 on separate components, such as shoes, or the like which are then removably affixed to each guide rail 11, 12.

A substantial advantage achieved by causing the mold parts to engage the bars resides in the fact that the course of the forces generated by the introduction of the mandrel 26 into the mold 16 is limited to the bridge 28, the mandrel 26, the mold 16 as well as the bars 11 and 12.

The fact that the guide rails 11, 12 project beyond the stand 10 and that the mold parts 16a, 16b are attached to the free ends of the levers 39 contributes significantly to the desired clear, easily super-visable and accessible structure of, for example, the mold 16 and other components. The bridge 28 serves similar purposes.

The feature of so arranging the guide rails 11 and 12 that the slope from the receiving station towards the removing station is advantageous in that from the very beginning of the mold motion from the receiving station towards the removing station a vertically downwardly directed component appears which effects a gradual increase of the distance between the mold 16 and the extruder head 25. Consequently, in case of a continuous extrusion of the parison, the latter cannot run into the mold.

According to the preferred embodiment described hereinbefore, the mandrel 26 does not move away from the removing station and thus the latter also serves as a fixed blow molding station. It is, however, feasible to so design the blow mandrel that it travels in unison with the mold. In such a case in the removing station there may be provided an auxiliary mandrel which serves to hold the finished blow molded article after the mold is opened.

What is claimed is:

1. In an apparatus for making hollow bodies of thermoplastic synthetic material using blow molding technique of the type that includes (a) an extruder supplying a parison, (b) a receiving station in the zone of said extruder, (c) a removing station spaced from said receiving station, (d) a hollow mold, (e) means for opening and closing said mold, (f) means for reciprocating said mold between said receiving station in which said mold is charged with a parison and said removing station in which a finished blow molded article is removed from said mold, (g) a support member possibly embodied as a mandrel introducible into said mold for expanding said parison therein by a fluid medium, the improvement comprising, in combination:
   A. guide means having a free end and extending substantially normal to the direction of extrusion;
   B. a carriage slidably mounted on said guide means;
   C. first drive means for moving said carriage back and forth on said guide means; and
   D. a bridge carried by said guide means in the vicinity of its said free end, said mandrel being disposed on said guide means.

2. An improvement as defined in claim 1, wherein said mold is a multi-part mold.

3. An improvement as defined in claim 1, wherein said guide means includes two parallel spaced guide rails.

4. An improvement as defined in claim 1, including a stand, said guide means being affixed to said stand and projecting freely therefrom.

5. An improvement as defined in claim 1, wherein said guide means slope downwardly in the direction from said receiving station towards said removing station.

6. An improvement as defined in claim 1, including additional equipment carried by said bridge.

7. An improvement as defined in claim 6, wherein said additional equipment includes a support means for carrying said finished article subsequent to the opening of said mold.

8. An improvement as defined in claim 6, wherein said mandrel is a blow mandrel.

9. An improvement as defined in claim 7, wherein said blow mandrel also constitutes said support means.

10. An improvement as defined in claim 6, including a plurality of cooperating gripper parts, one affixed to each mold part;
a conveyer track carried by said bridge, said conveyer track receiving said finished articles; and
a depositing station adjoining said conveyer track, said gripper being reciprocated between said removing station and said depositing station in unison with the reciprocation of said mold between said receiving station and said removing station.

11. An improvement as defined in claim 6, wherein said additional equipment includes impact knife means for removing scrap material from each finished blow molded article.

12. An improvement as defined in claim 1, wherein said mandrel is a blow mandrel permanently situated in said removing station, including means for providing an engagement between said mold and said guide means in said removing station at least for the period during which said blow mandrel is introduced into said mold.

13. An improvement as defined in claim 12, wherein said means for providing said engagement includes projections carried by said guide means at its side adjacent said blow mold, said projections having engagement faces oriented towards said mold parts.

14. An improvement as defined in claim 13, wherein said projections are formed as adjustable components separated from said guide means.

15. An improvement as defined in claim 1, including:

a plurality of intermediate levers, one connected with each of said arms;
a sole two-arm lever pivotally attached to said carriage and pivotally coupled to each of said intermediate levers; and
means pivotally connecting said second drive means to said sole two-arm lever at its pivotal connection with one of said intermediate levers.

16. An improvement as defined in claim 1, including:

means pivotally connecting each said mold part with the associated arm; and
a plurality of guide levers, one associated with each mold part, each guide lever having a first end pivotally connected to the associated mold part and a second end pivotally connected to said carriage.

17. An improvement as defined in claim 1, including:

E. a plurality of arms pivotally secured to said carriage, each arm having an end to which a mold part is secured,
F. second drive means mounted on said carriage and at least indirectly connected to each said arm to cause pivotal motion thereof, said second drive means being independent from said first drive means; said guide means, said carriage and said first drive means constituting said means for reciprocating said mold between said receiving station and said removing station; said arms and said second drive means constituting said means for opening and closing said mold.

18. An improvement as defined in claim 17, wherein said second drive means is formed as a sole power cylinder.

* * * * *